United States Patent [19]
Henderson et al.

[11] 3,841,461
[45] Oct. 15, 1974

[54] SINGULATOR

[75] Inventors: Jerald M. Henderson, Davis; Bruce M. Shawver, Cupertino, both of Calif.

[73] Assignee: The Regents of the University of California, Berkeley, Calif.

[22] Filed: July 20, 1972

[21] Appl. No.: 273,518

[52] U.S. Cl............................ 198/30, 198/1, 198/32
[51] Int. Cl................................................ B65g 47/26
[58] Field of Search................... 198/1, 32, 2, 8, 30

[56] References Cited
UNITED STATES PATENTS

| | | | |
|---|---|---|---|
| 2,840,090 | 6/1958 | Bradford | 198/218 X |
| 2,908,375 | 10/1959 | Hoover et al. | 198/32 X |
| 3,343,655 | 9/1967 | Howard | 198/1 X |

Primary Examiner—Richard A. Schacher
Assistant Examiner—Douglas D. Watts
Attorney, Agent, or Firm—Lothrop & West

[57] ABSTRACT

A singulator for rollable and slidable articles of compact configuration, such as fruit, has a frame supporting a feeding tray to present the articles at a datum region. One or more conveyors on the frame are available at the datum region. Each conveyor extends substantially horizontally from the datum region in a line and has a number of top surface areas spaced apart along the line. A number of eccentrics on a shaft parallel to the line are arranged in a predetermined polar relationship to move the surface areas up and down in timed relationship as the shaft revolves to approximate waves traveling along the line preferably at increased wave length away from the datum point and with a phase difference between two side-by-side conveyors.

4 Claims, 5 Drawing Figures

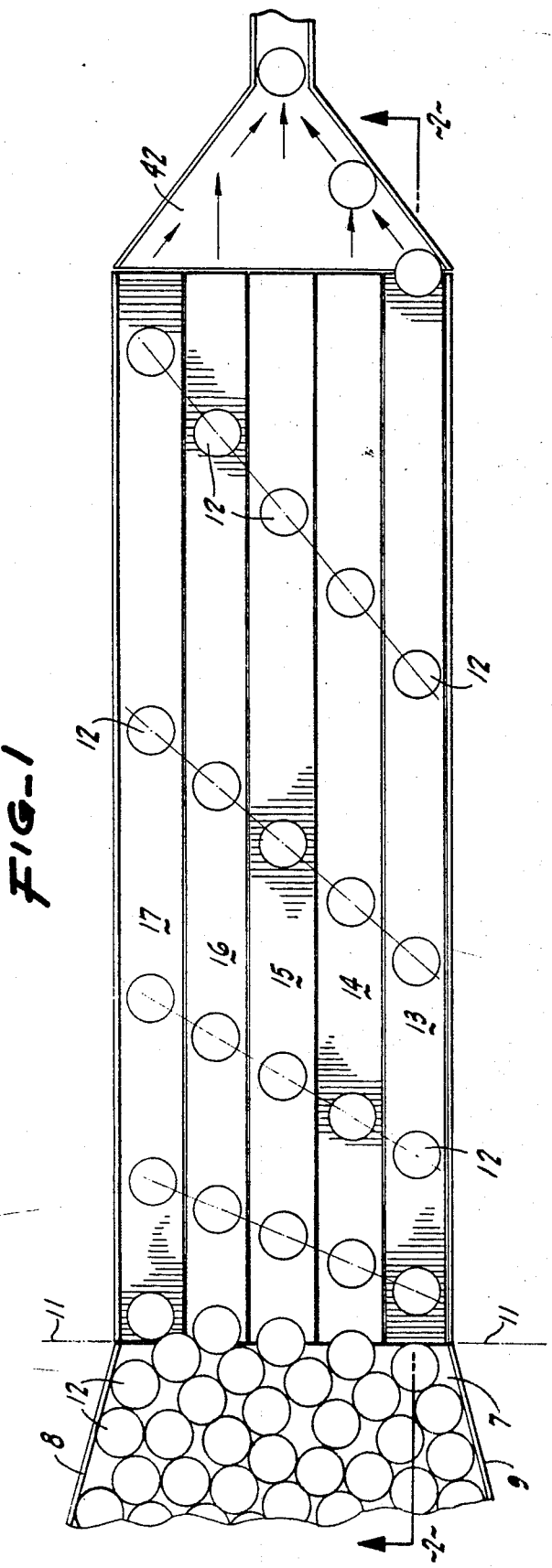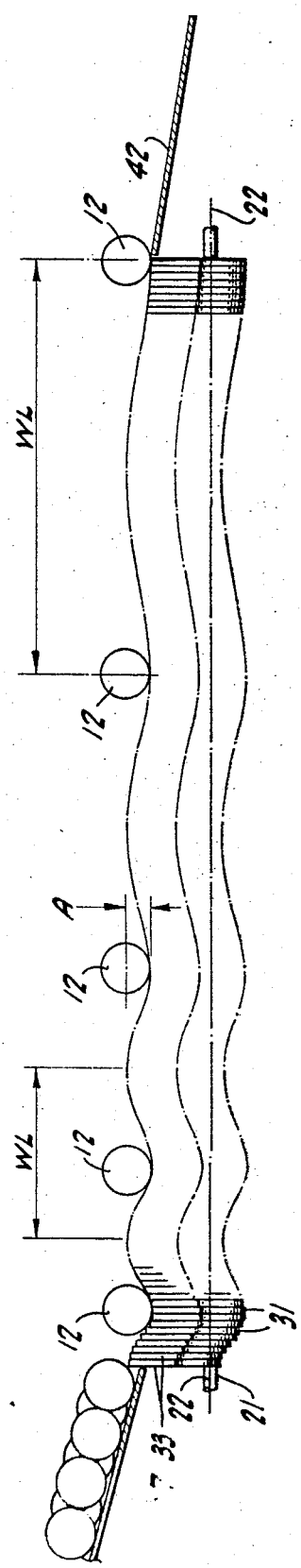

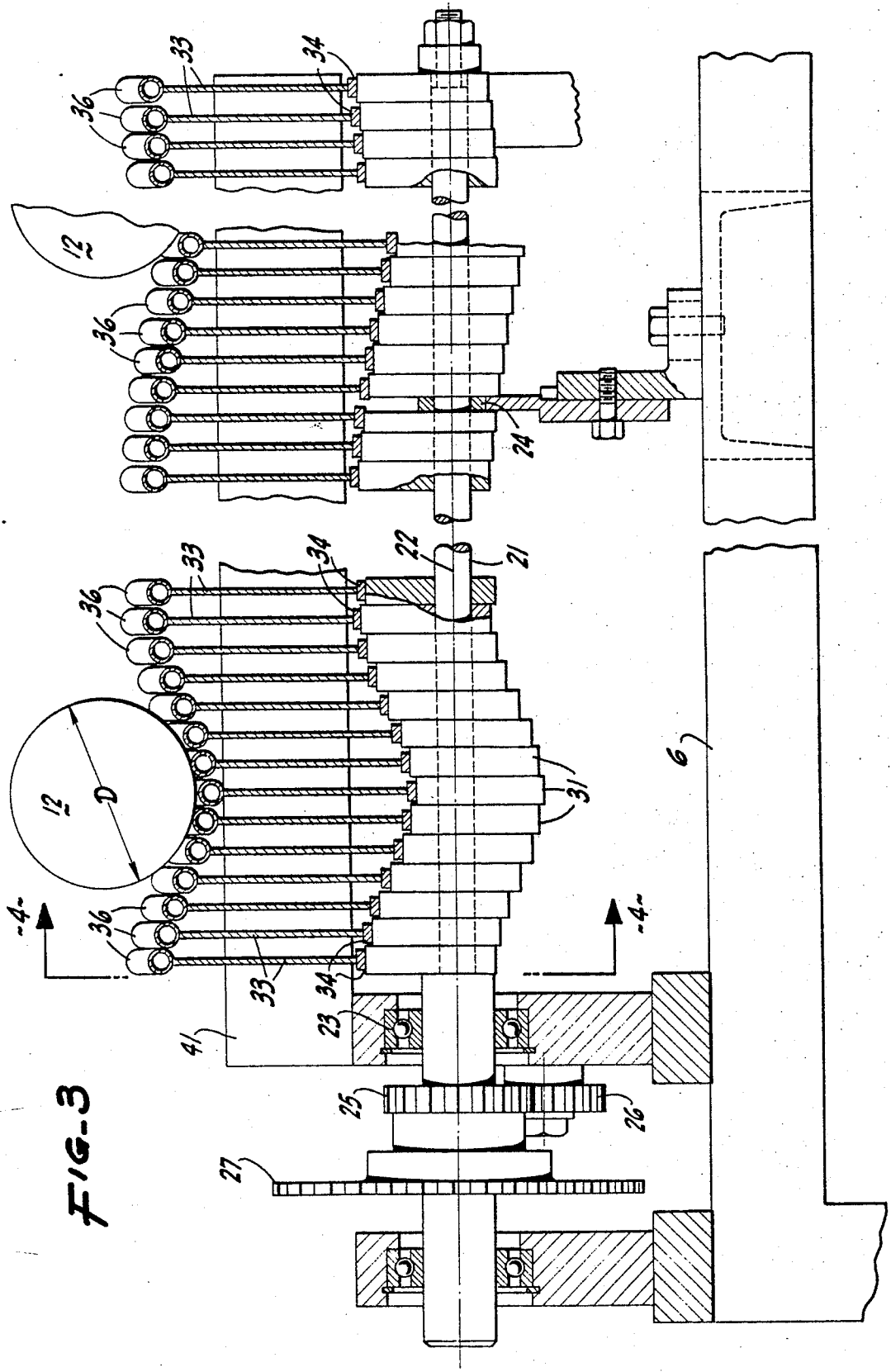

SINGULATOR

There are many articles that must be handled in bulk and that it is desirable to arrange in some particular positional array or sequence for subsequent handling. An example is in the handling of fruit, such as peaches or oranges or apples, in which a bulk quantity of fruit is dumped at random onto a supporting table for feeding to subsequent machines for processing. The machines are able to receive only individual fruit presented to them singly at a particular location. While apples and peaches and oranges are exemplary, there are also other compact articles such as small boxes, packages, machine parts and the like which can be advanced by sliding or tumbling or rolling over an inclined surface. These need to be singulated but are initially supplied in highly random order. Although there are devices for segregating or singulating various objects, sometimes they operate with considerable force and suddenness so that where the articles are relatively delicate there is likelihood of substantial injury. Also, some of the singulating mechanisms do not work with very great speed and hence have a relatively low capacity.

It is therefore an object of the invention to provide a singulator which will receive at random objects of the sort indicated and will effectively produce them as individuals at pedetermined locations for further handling and do so without injury and at a rapid rate.

Another object of the invention is to provide a singulator that can quite readily be manufactured and operated in a simple, straightforward fashion.

Another object of the invention is to provide a singulator that is relatively economical to make and maintain.

A further object of the invention is in general to provide an improved singulator.

Other objects together with the foregoing are attained in the embodiment of the invention described in the accompanying description and illustrated in the accompanying drawings, in which:

FIG. 1 is a plan of a singulator constructed pursuant to the invention, certain portions being broken away to reduce the size of the figure;

FIG. 2 is a diagrammatic cross-section through a portion of the mechanism, the vertical plane of section being indicated by the line 2—2 of FIG. 1;

FIG. 3 is a cross-section similar to FIG. 2, but showing the actual construction of the parts, portions being broken away to reduce the size of the figure;

Figure 4:
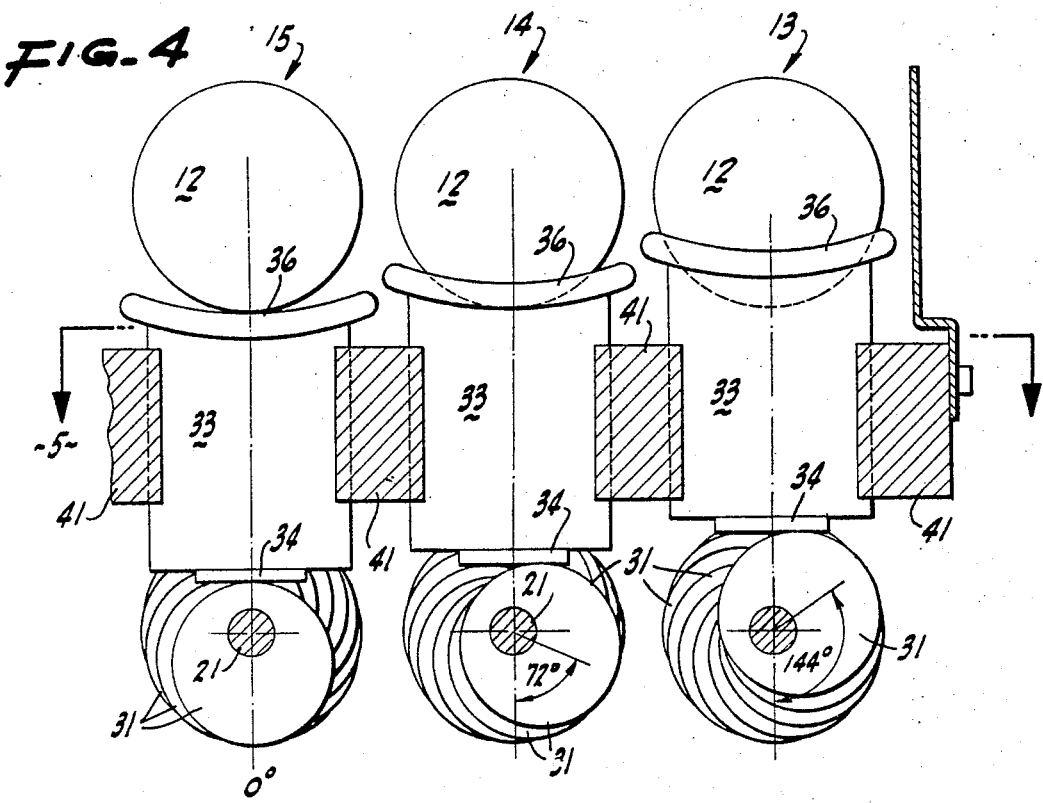
FIG. 4 is a cross-section to the scale of FIG. 3, the plane of section being indicated by the line 4—4 of FIG. 3.

While the singulator can be embodied in a widely different variety of forms, it has with success been embodied as shown herein. In this arrangement there is provided a main frame 6 fabricated of the customary shapes and angles and arranged to extend to substantially table height above the floor. At one end of the frame there is provided a tray 7 which usually is an inclined, flat sheet having converging side walls 8 and 9. The tray terminates in a datum region represented by a broken line 11 in FIG. 1. The region is in effect a narrow area extending horizontally and transversely at the lower end of the tray 7.

Supplied on the tray 7 and confined by the sides 8 and 9 thereof are the articles 12 to be singulated. These articles are disposed in any random sort of array but are supported on the tray at a sufficient angle so that they feed toward the right in FIG. 1 or toward the datum area 11 by gravity, perhaps assisted by vibration.

The articles 12, although illustrated as spherical, are in practice objects which are of the nature of fruit, such as peaches or oranges or articles, such as small packages or parts. All of these are generally characterized herein as slidable or rollable on an inclined surface and so being compact in configuration. This is intended to include objects which do not have a specific or regular geometrical shape but are nearly enough usual or regular in shape that they are readily handled by the device.

While the objects 12 are by no means necessarily of the same size, they are usually within a rather wide range of sizes for a particular machine. Larger objects or smaller objects can be handled by the same principle but it is preferred to have different machines each for a range of nearly related sizes. The size of a spherical object can be characterized by reference to its diameter but since the objects may be somewhat irregular, there is reference herein to their transverse dimension. This is intended to refer to a measure affording a fair indication of the range of size of the objects being handled.

Mounted on the frame 6 to one side of the datum region 11 and on the frame 6 are several conveyors 13, 14, 15, 16 and 17. A single conveyor works according to the principles of the invention. Any number of conveyors can be utilized. An arrangement of five side-by-side conveyors has been selected for illustration herein simply for convenience. Since each of the conveyors is mechanically just like the others a description of one applies as well to them. As shown particularly in FIGS. 3, 4 and 5, each of the conveyors includes a drive shaft 21 having an axis 22 extending in a generally horizontal line away from the datum region 11 or entrance end. The shaft 21 is mounted for rotation about the axis 22 in suitable bearings 23 and 24 supported on the framework 6. At one end the shaft 21 carries a driven pinion 25 in mesh with an idler 26, likewise meshing with the adjacent pinion 25. One of the similar shafts 21 carries a sprocket 27 designed to be chain driven by any suitable motor (not shown) so that the shaft 21 and all like shafts rotate at the same time and at the same rotational speed.

Mounted on the shaft 21 is a large number of eccentric disks 31. These eccentrics may not be but preferably are all alike and are arranged side-by-side for the full length of the shaft except alongside the support bearing 24 whereat the adjacent eccentrics are somewhat thinner than the others. Each of the eccentrics is secured to the shaft 21 in a particular polar relationship and is affixed to revolve with the shaft. Each eccentric is placed on the shaft in a different angular or polar position from the immediately preceding eccentric, as shown in FIG. 4. Preferably, the eccentrics near the datum region 11 are displaced polarly from each other a matter of a large number of degrees each. The eccentrics at the far end of the machine are displaced from each other angularly or polarly in a relatively small amount. There is usually a uniform change in polar spacing of the eccentrics beginning at the datum region end of the shaft 21 and extending to the other end thereof. While it is possible to make the eccentrics of different amounts of eccentricity, it is satisfactory and at present is preferred to have all of the eccentrics substantially the same in eccentricity or eccentric radius. In place of the individual eccentrics there can be provided a continuous shaft which is specially turned in a sort of screw fashion so that the envelope curvature of the special shaft is substantially the same as the envelope configuration of the shaft with the eccentrics on it.

Figure 5:
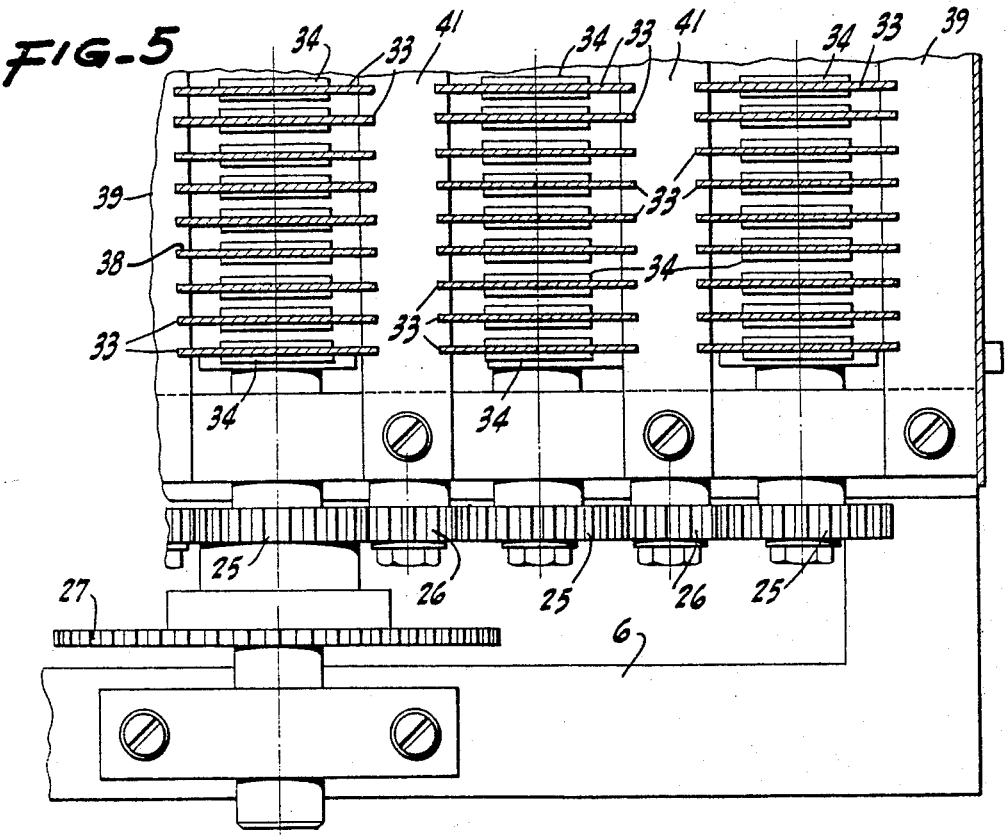
FIG. 5 is a fragmentary cross-section, the plane of which is indicated by the line 5—5 of FIG. 4.

Adapted to operate against each eccentric is a related slide 33 in the form of a relatively thin plate of metal or plastic. A shoe 34 at the lower end of the slide is designed to rest on the eccentric. An upwardly concave, transversely extending portion of an annulus 36 forms a top edge or top surface area for the slide 33. The slide is positioned and guided for up and down movement. Particularly as shown in FIGS. 4 and 5, the slide side edges are captured in grooves 38 in bars 39 and 41 secured to the frame 6 and extending parallel to the axis 22. The various grooves 38 receive the slide edges freely and hold them immediately opposite each other so the slides extend perpendicular to or normal to the axis 22. The slides follow the eccentrics in up and down movement but are not displaced laterally or sideways by the eccentric rotation.

All of the slides or plates are substantially identical and each follows its nether eccentric in the timed sequence imparted to it by the specially positioned eccentric. When the shaft 21 rotates the envelope curvature of the upper edges of the plates or slides in effect defines or describes an undulatory, wave-like configuration. The apparent wave travels from the datum or entrance region to the far end or discharge end of the machine. Since the positioning of the eccentrics is polarly different at the far end than it is at the near end, the wave length WL, FIG. 2, is relatively short near the datum region but is quite long at the far end of the machine, increasing gradually from one end to the other. The wave length change is usually a selected function, although it can be according to some other plan if desired.

As shown particularly in FIG. 2, the amplitude A of the wave form is usually constant, although, as noted above, variable amplitudes can likewise be provided, if desired, by varying the eccentricity of the eccentrics. The dimension for the wave length WL (especially near the datum region) and the dimension for the amplitude A are preferably correlated in the design of the machine with the transverse dimension D (FIG. 3) of the articles being singulated. For example, the wave length WL is made at least as great as the dimension D. Preferably, even the shortest wave length is somewhat greater than the dimension D in order to provide, as shown toward the left end of FIG. 2, a trough within which a single article can conveniently be cradled. The amplitude is quite easily varied. It need not be as great as the dimension D but should be great enough so that the apparent wave produced in the machine is more than a barely perceptible ripple and is effective to segregate individual objects. It is said in the claims that the amplitude A is a small-number fraction of the dimension D. By that is meant that the amplitude is perhaps half or a third or a quarter or three-halves or so of the dimension D or of an average dimension D. Furthermore, the various rounded ends, upper edges or partial annulli 36 have a transverse extent or width approximately that of the dimension D, although this is not highly critical.

Although the various conveyors 13, 14, 15, 16 and 17 are identical in mechanical construction and in individual operation, they are related to each other, as shown in FIG. 4 particularly, by having the individual shafts 21 out of phase with each other. For example, if in conveyor 15 the entrance end eccentric 31 happens to be at what may be termed a zero phase position or bottom center position, then conveyor 14 has its entrance end eccentric 31 displaced seventy-two degrees away from the corresponding shaft 21. The shaft 21 of the conveyor 13 is displaced 144° away from the shaft 21 of the conveyor 15. By this means the various conveyors are made to operate each according to the same pattern but the patterns or at least some of them are out of step or out of phase.

In the operation of this arrangement the various shafts are powered and rotate so that there appears, as shown particularly in FIG. 2, an undulatory, vertical traveling wave in conveyor 13, for example. The apparent wave has constant amplitude but continuously increasing wave length. When the entrance end slide or plate 33 adjacent the datum zone 11 or entrance end is in its uppermost position, it serves as a barrier to an adjacent object 12 and holds that object in place. As the shaft rotates and as the eccentric turns and the end plate 33 descends, it passes through a median position with its upper edge or top area substantially even or flush with the adjacent tray edge and eventually gets low enough so that at some time the object 12 can roll or slide from the inclined tray 7 and ride or advance over the upper edge 36 of the slide or plate into a partial trough. After the object 12 has started it is advanced by the ascending order of plates or slides behind it and is by gravity centralized in a traveling trough, as shown in FIG. 2. Since the initial reciprocating plates are on eccentrics spaced polarly quite far apart, before the next article can get into a position to enter the trough the plate or slide 33 adjacent the datum region has again risen and acts as a barrier until it again descends.

Once the leading object 12 has gotten into an initial trough it is urged or nudged toward the right in FIG. 2 at increasing wave lengths. Successive articles become spaced farther and farther apart until finally an article which was immediately adjacent a similar article on the tray 7 is widely spaced from its former neighbor and can individually roll off onto a discharge plate 42 to be taken away singly for further handling.

Again, at the datum region an adjacent object 12 near the conveyor 14, say, might very well roll directly into that conveyor when the initial barrier is lowered or might transfer somewhat laterally from an intermediate position into that conveyor. The lateral transfer is assisted in that in end elevation, as shown in FIG. 4, the various upper edges 36 maintain, in effect, a transverse wave-like configuration. For example, if the rising barrier in conveyor 13 happens to be a little high to accept an object adjacent to it, nevertheless the barrier of the next conveyor 14 might be sufficiently lower so that the object will slide or roll and be nudged from between the entrance to conveyor 13 toward the lowering entrance to conveyor 14. There thus may be some lateral or transverse distribution and nudging of the random objects. The individual conveyors have variable wave length and are out of phase so that the entering objects arrange themselves substantially as shown in plan in FIG. 1. They are not only spaced transversely because they are in different channels but are also spaced longitudinally since they are differently separated. They arrive at the end point at different times and thus are completely singulated.

What is claimed is:

1. A singulator for rollable or slidable articles of compact configuration having known transverse dimensions and assembled in a random array comprising a frame, means on said frame having an upper surface for supporting said articles adjacent a datum region, said surface sloping toward said region, a pair of conveyors of the same length on said frame and extending from said datum region side by side in approximately horizontal lines to a discharge end, separate means defining on each of said conveyors a number of separately movable top surface areas spaced apart along said lines, means for separately moving said areas of each conveyor up and down in timed relationship to each other within each conveyor to approximate waves traveling along said line and means for operating said conveyors with said waves of each conveyor out of phase with said waves of the other conveyor whereby articles on one conveyor are spaced longitudinally from articles on the other conveyor and said articles are discharged from said conveyors in single article sequence.

2. A singulator as in claim 1 in which the wave length of said waves increases with distance from said datum region.

3. A singulator for rollable or slidable articles of compact configuration comprising a frame having an entrance end and a discharge end, a conveyor comprising a first drive shaft, means for journalling said drive shaft on said frame to extend between said entrance end and said discharge end for rotation about a substantially horizontal axis, means for rotating said shaft, a plurality of eccentric disks and including an entrance disk at the entrance end of said shaft, means for fastening said disks on said drive shaft along the length of said shaft in a predetermined polar relationship at successively smaller polar angles to each other from said entrance end to said discharge end, a plurality of planar slides each having a drive edge and an opposite top surface area, means on said frame for supporting said slides for vertical reciprocation between a low point and a high point and in alignment in the direction of said axis, with the plane of each of said slides normal to said axis, and with the drive edge of each of said slides in abutment with a respective one of said eccentric disks, and means defining a sloping feeder surface at said entrance end for supporting articles from the bottom and terminating in an edge adjacent said entrance disk slide between said low point and said high point whereby said entrance disk slide functions as a metering gate to admit only a single article from said feeder surface to said conveyor at each rotation of said shaft.

4. A singulator as in claim 3 including a second conveyor comprising a second drive shaft, means for journalling said second drive shaft on said frame for rotation substantially parallel to and at the same height as said first drive shaft between said entrance end and said discharge end, a plurality of second eccentric disks on said second drive shaft and including an entrance second disk, means for fastening said second disks along the length of said second shaft in a predetermined polar relationship at successively smaller polar angles to each other from said entrance end to said discharge end, means for driving said first drive shaft and said second drive shaft in timed relation but out of phase with each other, a plurality of second slides engaging said second eccentric disks, means for constraining said second slides for vertical movement between a low point and a high point, and in which said feeder surface edge extends transversely across both of said entrance first disk and said entrance second disk.

* * * * *